(12) United States Patent
Langbert

(10) Patent No.: US 10,925,395 B2
(45) Date of Patent: Feb. 23, 2021

(54) MOVEABLE AND STORABLE WARDROBE

(71) Applicant: Jon Langbert, Addison, TX (US)

(72) Inventor: Jon Langbert, Addison, TX (US)

(73) Assignee: Plush Cujo LLC, Lakeway, TX (US)

( * ) Notice: Subject to any disclaimer, the term of this patent is extended or adjusted under 35 U.S.C. 154(b) by 0 days.

(21) Appl. No.: 16/372,032

(22) Filed: Apr. 1, 2019

(65) Prior Publication Data

US 2019/0335899 A1 Nov. 7, 2019

Related U.S. Application Data

(60) Provisional application No. 62/652,696, filed on Apr. 4, 2018.

(51) Int. Cl.
| | |
|---|---|
| *F41H 7/00* | (2006.01) |
| *A47B 61/06* | (2006.01) |
| *E04H 3/02* | (2006.01) |
| *A47B 83/00* | (2006.01) |
| *A47B 67/00* | (2006.01) |

(52) U.S. Cl.
CPC ............ *A47B 61/06* (2013.01); *A47B 67/005* (2013.01); *A47B 83/00* (2013.01); *E04H 3/02* (2013.01)

(58) Field of Classification Search
CPC . E05D 15/00; E05D 15/1042; E05D 15/1005; E05D 15/30; E05D 2015/1031; E05D 2015/1034; E05D 2015/1026; E05Y 2900/20; E05Y 2201/64; E06B 3/4672; E06B 3/46; B62B 3/00; B62B 3/004; B62B 3/003; B62B 3/005; A47B 61/06; A47B 61/00; A47B 61/003; A47B 97/00

USPC ........ 52/36.1, 36.2, 32, 34; 89/36.07, 36.09, 89/918, 920, 929; 109/22, 49.5, 51, 52, 109/64, 78, 79, 58

See application file for complete search history.

(56) References Cited

U.S. PATENT DOCUMENTS

| | | | | |
|---|---|---|---|---|
| 3,294,464 | A * | 12/1966 | Lew | A47B 43/02 312/258 |
| 9,310,170 | B1 * | 4/2016 | Basewitz | F41H 5/14 |
| 2001/0050517 | A1 * | 12/2001 | Spitzer | A47B 57/06 312/249.8 |
| 2005/0098403 | A1 * | 5/2005 | McIntyre | A45C 5/04 190/110 |
| 2007/0295570 | A1 * | 12/2007 | Campbell | A45C 5/14 190/15 R |
| 2009/0213359 | A1 * | 8/2009 | Fourcault | G01P 3/36 356/28 |

(Continued)

*Primary Examiner* — Chi Q Nguyen

(57) ABSTRACT

A wardrobe capable of being moved into and out of a hotel room, and into and out of a storage room, is disclosed. The wardrobe comprises a top, a bottom, two side walls, a back, and four wheels along the bottom, where the wardrobe would otherwise touch the floor. The wheels can optionally be lockable wheels. The wardrobe also includes a means for attachment to one or more walls in a room in which the wardrobe will be used. Suitable means for attachment include holes through which pins can be inserted, pins which fit into holes in a wall, Velcro or other hook and loop attachments, straps, ropes, magnets, clips, cotter pins, and the like. The wardrobe can optionally include one or more additional elements, including one or more doors, one or more drawers, shelves, closet rods, tie/belt racks, mirrors, cubby holes, a cover for the wheels, a safe, and crown, chair, and/or base molding.

20 Claims, 13 Drawing Sheets

(56) References Cited

U.S. PATENT DOCUMENTS

| | | | | |
|---|---|---|---|---|
| 2011/0278879 | A1* | 11/2011 | Belanger | B29C 70/86 |
| | | | | 296/187.01 |
| 2015/0068124 | A1* | 3/2015 | Fornasari | A47B 61/003 |
| | | | | 49/130 |
| 2015/0332528 | A1* | 11/2015 | McGinnis | G07C 9/00563 |
| | | | | 109/38 |
| 2016/0003583 | A1* | 1/2016 | Harwood | A47B 91/00 |
| | | | | 89/36.09 |
| 2016/0312521 | A1* | 10/2016 | Berger | E05D 15/00 |
| 2017/0332782 | A1* | 11/2017 | Castro | A47B 61/003 |
| 2020/0054128 | A1* | 2/2020 | Gilbert | B62B 3/10 |

* cited by examiner

MOVEABLE AND STORABLE WARDROBE

This application claims priority from U.S. Provisional Application No. 62/652,696, filed on Apr. 4, 2018, the disclosure of which is incorporated herein by reference in its entirety.

The present invention refers to a wardrobe, specially designed to be movable into and out of a hotel room and storage room, and also capable of being fixed in position inside of a hotel room.

BACKGROUND OF THE INVENTION

Many business travelers visit the same city multiple times a year, and stay for extended periods of time. It can be a tremendous burden to have to pack for long trips, then pack up to head home, only to have to repeat these steps multiple times throughout the year.

For some business travelers, it would be advantageous to have a way to store their clothes and other personal belongings at the hotel. That way, business travel could be streamlined, as the travelers would not need to pack as much clothing, and could travel with less difficulty. It would also be advantageous to travelers if they could leave suitcases and other possessions at a hotel, or other form of accommodation, to save on baggage fees, and the inconvenience of taking bags to meetings on their days of arrival and departure. However, there has historically not been an efficient way for a hotel to store traveler's possessions for an extended period of time in between their visits to the hotel.

One way to do this might be to use rolling wardrobes, and there are certainly examples of these, though they tend not to be furniture grade, and offer the disadvantage of not being affixed to a wall in the hotel room, which is less than aesthetically pleasing.

It would be desirable to have a rolling wardrobe, which is capable of being affixed to one or more walls in a hotel room, and being easily moved to an external storage unit, so that repeat visitors can leave certain possessions behind at the hotel, and have them easily moved into and out of a hotel room when they visit. It would be particularly desirable for such a rolling wardrobe to blend in as seamlessly as possible with the overall design of the hotel room. The present invention provides such a rolling wardrobe.

SUMMARY OF THE INVENTION

With the rolling wardrobe described herein, the drawbacks associated with prior rolling wardrobes can be solved, presenting other advantages that will be described.

In one embodiment, the present invention relates to a rolling wardrobe. The wardrobe comprises a top, a bottom, and side walls. The wardrobe optionally but preferably comprises a back, which can include a means for attaching the wardrobe to a wall, such as a wall in a room, which can be a hotel room.

In some embodiments, the wardrobe also comprises one or more doors, or sliding shutters. In one aspect of this embodiment, at least one door or sliding shutter comprises a locking mechanism.

Inside the wardrobe, there can be one or more closet rods, drawers, safes, storage boxes, mirrors, cubby holes, shelves, tie/belt racks, hampers, and the like. In one embodiment, the shelves have the ability to fold up, and as such, can be folded to create more space as needed. In another embodiment, the shelves are moveable, such as by including shelf pins and a series of holes in which to place the shelf pins and relocate the shelves as desired.

The wardrobe is ideally sized to be able to be rolled through a door. The height of doors in hotel rooms is typically at least 6 feet 8 inches (i.e., 80 inches), and is typically between about 6 feet 8 inches and about 10 feet. The width of doors in hotel rooms is typically at least 32 inches (2.67 feet), and typically is between about 32 inches and 48 inches. Accordingly, the height of the wardrobe, from the wheels at the bottom all the way to the top, is typically between about 74 and about 118 inches, more typically between about 78 and about 90 inches, and depends, in large part, on the doors through which it is intended to be wheeled. The width is typically between about 24 and about 60 inches, more typically between about 36 and about 48 inches. The depth is typically between about 15 and about 30 inches, more typically between about 20 and about 28 inches, and still more typically between about 20 and about 24 inches.

Standard hangers are usually between 16 inches to 18 inches, so the closet rods, if present, are spaced to provide room for the hangars, and the clothes fitting on the hangers. This can be accomplished, for example, by keeping a gap of around 3 inches between the rod and any shelf that might be placed above it so that hangers can be easily accessed. Rods are typically at a height of around 36 inches for pants and around 40 inches for shirts. For dresses and coats, the rods typically hang at a height of between around 66 inches and around 72 inches.

In those embodiments, where shelves are present, the shelves can run through the entire depth of your wardrobe, or a portion thereof, and in some embodiments, are pull-out shelves. In this aspect, the pull-out shelves ensure that the entire shelf is accessible and nothing gets lost at the back. In another aspect the shelves are between about 15 and about 18" deep, which depth is ideal for stacking shirts, pants, and the like. Where more than one shelf is used, the height between any two shelves is typically between about 10 inches and about 12 inches.

In one embodiment, there is a divider roughly between about a third of the width, and about half of the width, so that closet rods for pants and shirts can be placed on one portion of the wardrobe, and a closet rod for dresses and coats can be placed on another portion of the wardrobe.

The wardrobe is generally of a rectangular or square shape. Where the wardrobe would otherwise touch the floor, there are four wheels, at or near each corner of the bottom of the wardrobe. If the wheels are placed too far inwards (i.e., more than a few inches from each corner of the wardrobe), the wardrobe may inadvertently tip over when rolled, so the wheels are typically at or near the corners of the bottom of the wardrobe. In one embodiment, one or more of the wheels can be locking wheels.

In one embodiment, one or two slides are located at or near the center of the bottom of the wardrobe, which slides extend outward, and include a wheel. The one or two wheels can provide additional stability when the wardrobe is moved, and they can slide back to a position hidden from view when the wardrobe is in a more fixed position, that is, when the wardrobe is not being moved. In another embodiment, one or more wheels attached to a brace are releasably attached to the frame of the wardrobe, so as to provide additional stability while the wardrobe is moved, and removed, for example, when the wardrobe is at or near its desired location.

In another embodiment, one or more wheels are mounted, for example, on a hinge, so that they can be moved downward so as to allow the wardrobe to move, and upward, when it is desired to stop the wardrobe from moving. In one aspect of this embodiment, the wheels are locking wheels, and include a lever one can depress, for example, by pressing down on the lever to lock and unlock the wheels.

In one embodiment, a hinged cover is located near the bottom of the front of the wardrobe, and when the wardrobe is not being wheeled around, the cover can cover all or part of the wheels.

The wardrobe can be made of virtually any material, but is preferably made of wood. The wood can be solid wood, particle board or MDF with a veneer cover, plywood, and combinations thereof. Ideally, the wardrobe is designed to mirror the décor of the room into which it is placed. In some embodiments, the wardrobe can include crown, chair, and/or base molding, designed to mirror crown, chair and/or base molding in the hotel room in which the wardrobe is to be used. In some aspects of these embodiments, the molding is provided in a manner which, when the wardrobe is affixed to a wall, fits in register with molding on the wall.

The wardrobe is adapted to be releasably affixed to one or more walls, or a wall that includes an enclosure adapted to receive the wardrobe. The one or more walls are present, for example, in a room, such as a hotel room. That is, the one or more walls and the wardrobe each include a component that allows the wardrobe to be releasably affixed to the one or more walls. Such components can be, for example, one or more holes in the wall, which register with one or more pegs on the back of the wardrobe. The components can alternatively be one or more magnets, or one or more hook and loop fasteners.

In one embodiment, a wall includes a recess adapted to fit the wardrobe, and in use, the wardrobe is slid into the recess. The recess is typically between about 1 and about 12 inches in depth, more typically between about 1 and about 3 inches in depth. By fitting the wardrobe into a recess, one can minimize lateral movement, so as to help stabilize the wardrobe in place while it is releasably affixed to the wall.

In another embodiment, the room in which the wardrobe is to be located includes a wall which includes one or more protrusions, which can themselves be walls, or, in one aspect of the embodiment, can be made of the same material as the wardrobe.

The one or more protrusions typically have a depth less than or equal to the depth of the wardrobe. Where there are two such protrusions, or where there is a wall parallel to a protrusion, the distance between the two protrusions, or the parallel wall and the protrusion, can be appropriately sized to receive the wardrobe, such that the wardrobe can be rolled into place between the protrusions, or between a protrusion and a wall.

In one aspect of this embodiment, the wardrobe comprises a face frame, which itself protrudes beyond the sides of the wardrobe, such that when the wardrobe is placed between two protrusions, the face frame fits flush, or substantially so, with the protrusions, thus providing a visual impression that the protrusions are the outside walls of the wardrobe. In this aspect, the protrusions can be formed of the same material, and, when made of wood, can be finished with the same stain and/or finish, as the wardrobe.

The wardrobe can be attached to the protrusions, for example, using male/female or female/male attachments on the protrusions and the face frame of the wardrobe, by magnets on the protrusions and the face frame, or other such means of attachment.

BRIEF DESCRIPTION OF THE DRAWINGS

For a better understanding of what has been described some drawings are attached in which, diagrammatically and only as a non-limitative example, a practical case of embodiment is shown.

DETAILED DESCRIPTION

The rolling wardrobe described herein can be better understood with reference to the following detailed description.

I. Wardrobe Components and Design Features

The rolling wardrobe described herein comprises a top, a bottom, and side walls. These components are typically, but need not be, made of the same material.

The wardrobe can be made of virtually any material, but is preferably made of wood. The wood can be solid wood, particle board or MDF with a veneer cover, plywood, and combinations thereof. In one embodiment, the wardrobe includes a plywood or particle board shell, and a face frame of solid wood.

The wardrobe can also be made of other materials, including plastics, metals, and composite materials, depending on the design considerations for the rooms in which the wardrobe is being placed.

Ideally, the wardrobe is designed to mirror the décor of the room into which it is placed. In some embodiments, the wardrobe can include crown, chair, and/or base molding, designed to mirror crown, chair and/or base molding in the hotel room in which the wardrobe is to be used. In some aspects of these embodiments, the molding is provided in a manner which, when the wardrobe is affixed to a wall, fits in register with molding on the wall.

The wardrobe is ideally sized to be able to be rolled through a door. The height of doors in hotel rooms is typically at least 6 feet 8 inches (i.e., 80 inches), and is typically between about 6 feet 8 inches and about 10 feet. The width of doors in hotel rooms is typically at least 32 inches (2.67 feet), and typically is between about 32 inches and 48 inches. Accordingly, the height of the wardrobe, from the wheels at the bottom all the way to the top, is typically between about 74 and about 118 inches, more typically between about 78 and about 90 inches, and depends, in large part, on the doors through which it is intended to be wheeled. The width is typically between about 24 and about 60 inches, more typically between about 36 and about 48 inches. The depth is typically between about 15 and about 30 inches, more typically between about 20 and about 28 inches, and still more typically between about 20 and about 24 inches.

Figure 1:
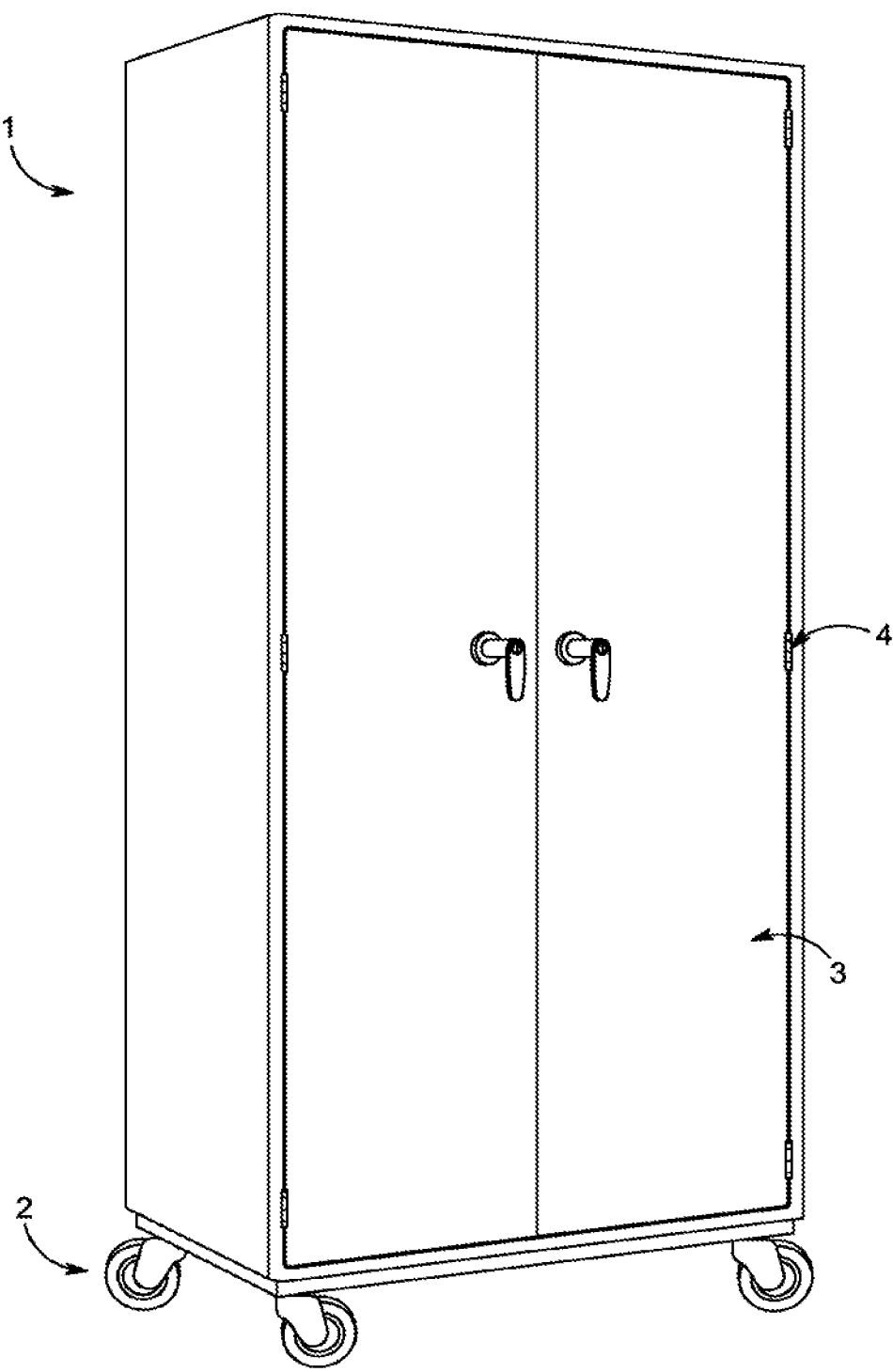
FIG. 1 is a perspective view of one embodiment of the moveable wardrobe described herein.

FIG. 1 is a perspective view of one embodiment of the moveable wardrobe described herein. The wardrobe (1) includes two doors (3), which can be locked, and four wheels (2) on the base of the wardrobe.

Figure 2:
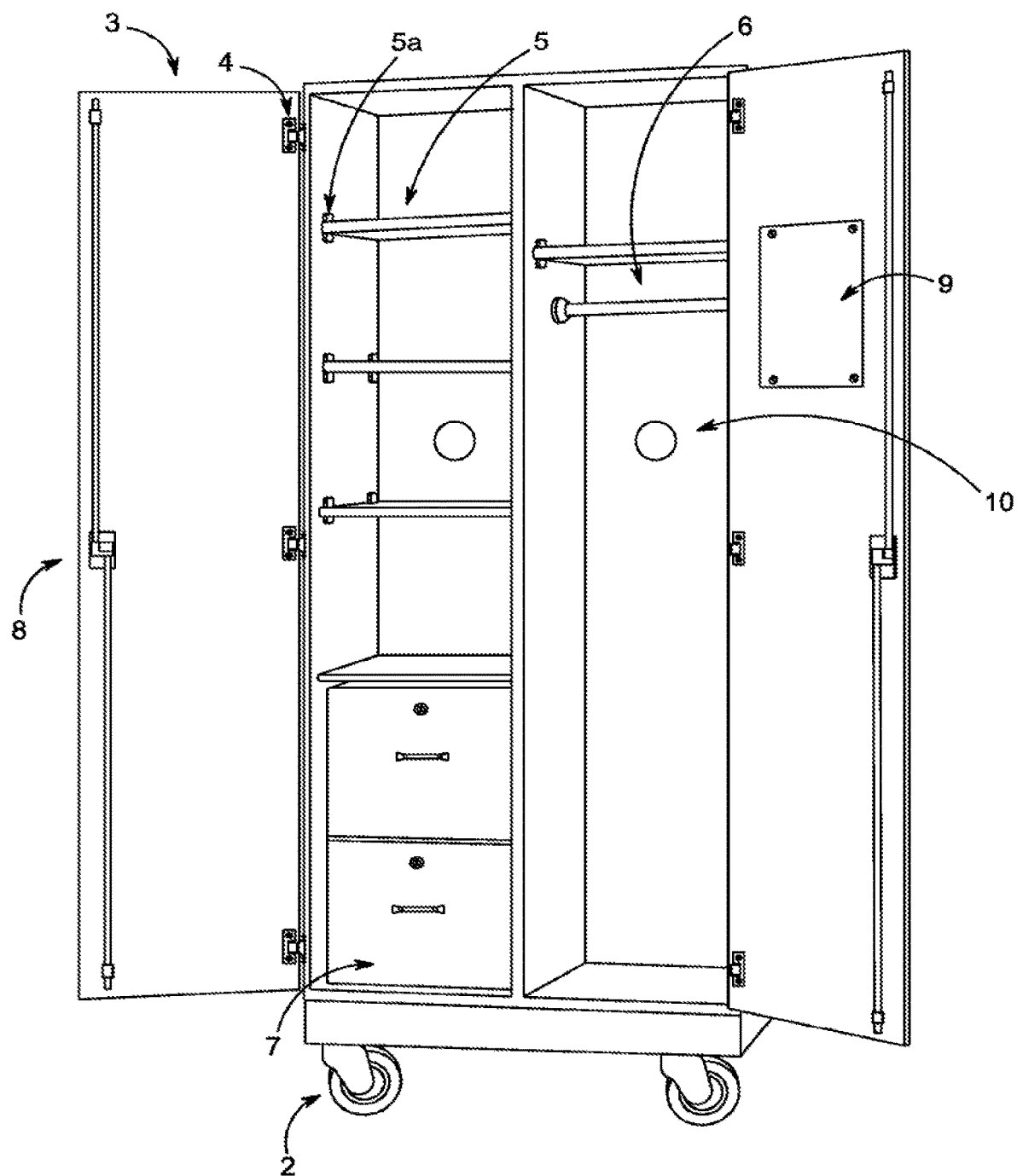
FIG. 2 is a front view of the moveable wardrobe, with the doors open, showing the interior closet rod, adjustable shelves, drawers, mirror, and openings in the back adapted to receive a protrusion from a wall to which the wardrobe is to be attached.

FIG. 2 shows the wardrobe when the doors are open. Visible inside the wardrobe (1) are shelves (5), open doors (3) showing the locking mechanism (8), two drawers (7), a closet rod ((6), a mirror (9), and two openings/holes in the back (10) to connect to a protrusion on the wall on which the wardrobe is to be releasably attached.

Figure 3:
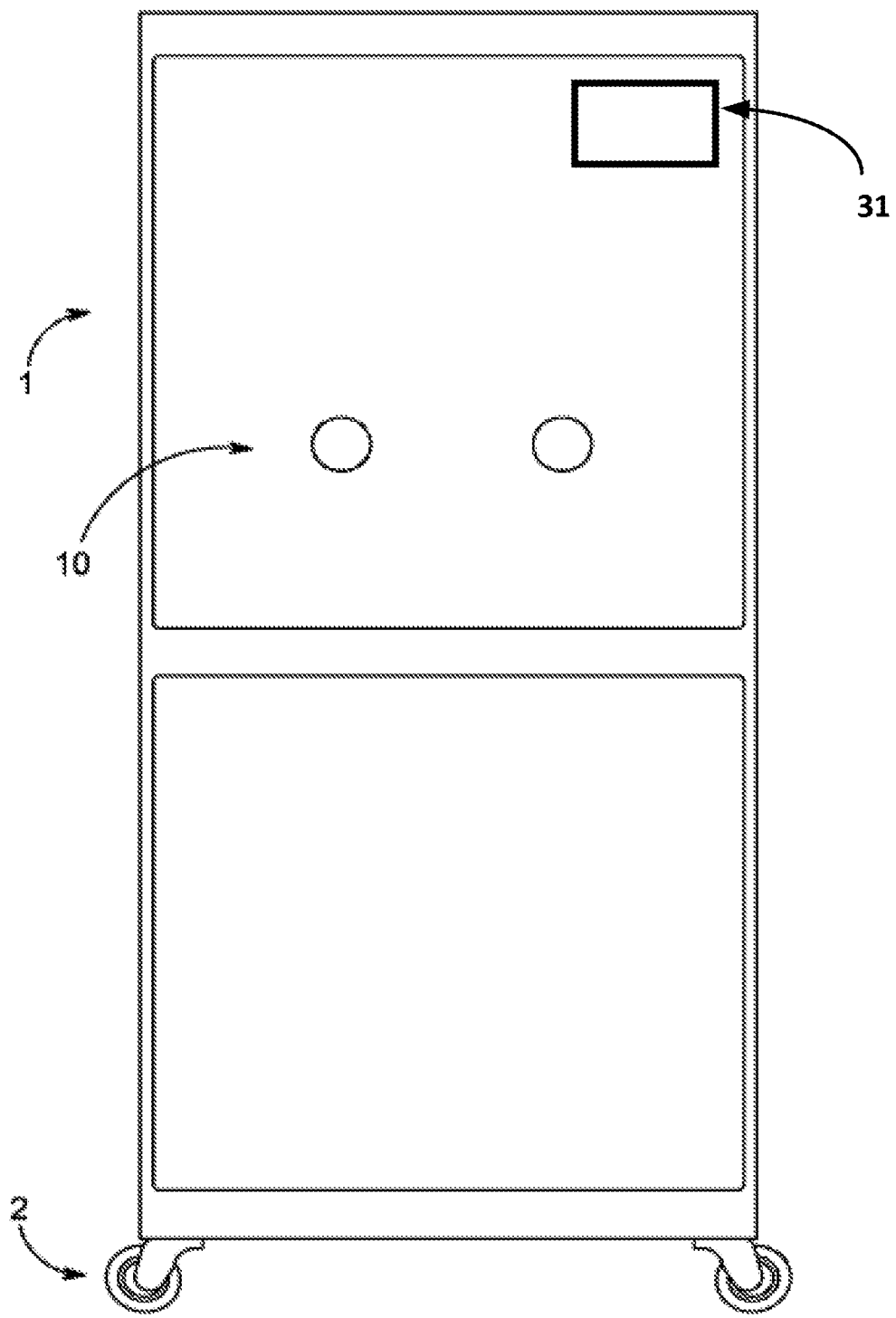
FIG. 3 is a rear view of the wardrobe, showing openings in the back adapted to receive a protrusion from a wall to which the wardrobe is to be attached.

FIG. 3 is a rear view of the wardrobe (1), showing openings in the back (10) adapted to receive a protrusion from a wall to which the wardrobe is to be attached.

Figure 4A:
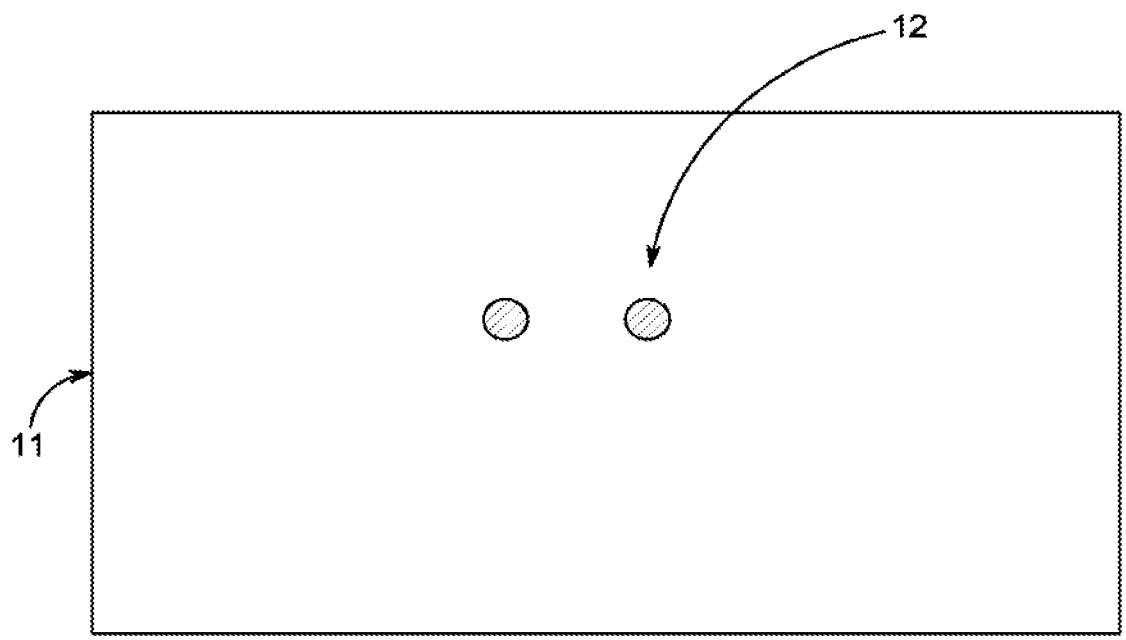
FIG. 4A is a view of a wall with protrusions placed so as to be able to penetrate holes on the back of a moveable wardrobe as described herein.
Figure 4B:
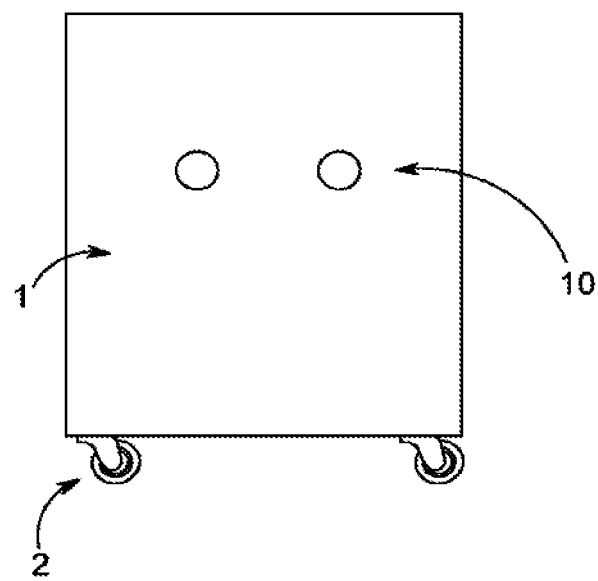
FIG. 4B is a rear view of a moveable wardrobe, with holes adapted to receive the protrusions on the wall shown in FIG. 4A.

FIG. 4A is a view of a wall (11) with protrusions (12) placed so as to be able to penetrate holes on the back of a moveable wardrobe as described herein, and FIG. 4B is a rear view of a moveable wardrobe (1), with holes (10) adapted to receive the protrusions on the wall shown in FIG. 4A.

Figure 5:
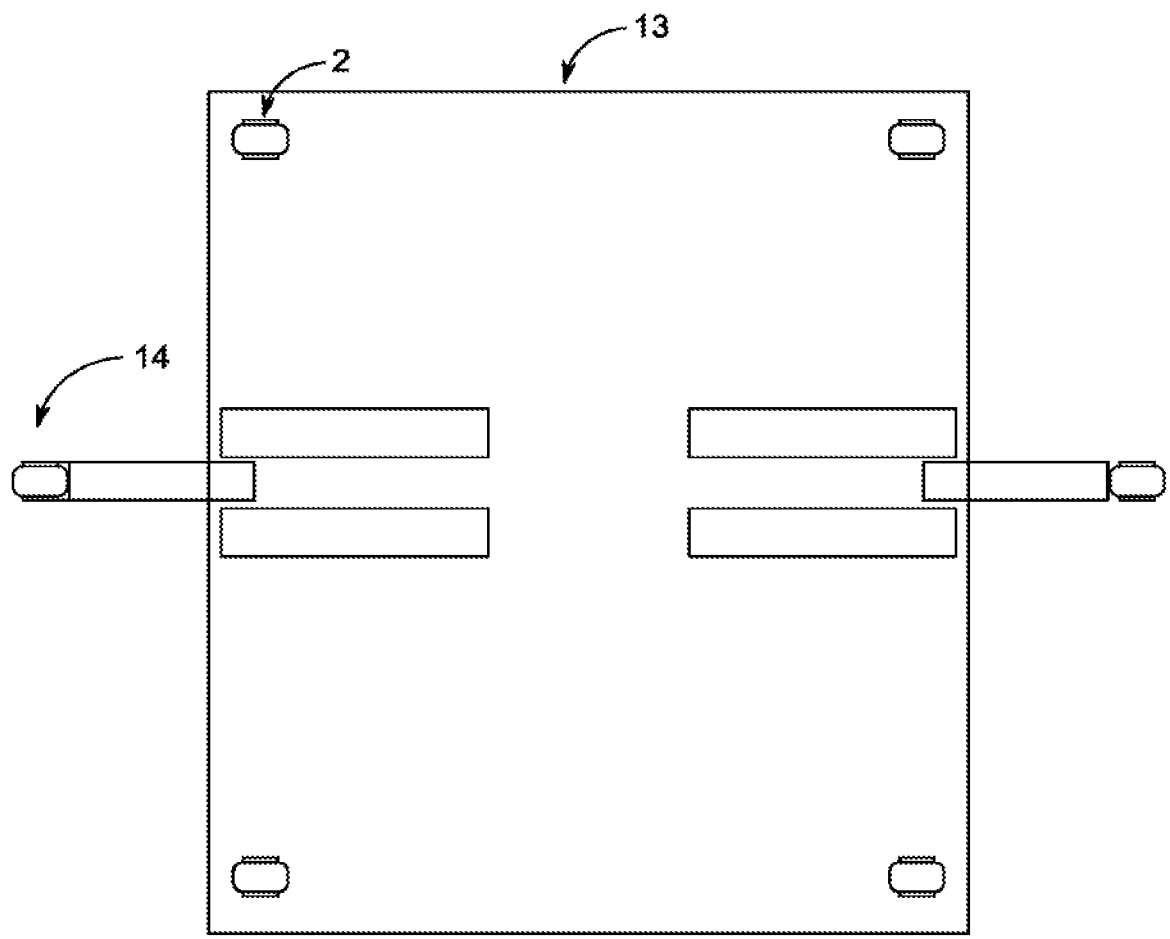
FIG. 5 is a view of the base of the wardrobe from underneath, showing an embodiment where extendible wheels can slide in and out along a track, providing stability to the moveable wardrobe when it is being moved.

FIG. 5 shows an embodiment where extendible wheels (14) are present on the base of the wardrobe (13), one on each side. By extending the wheels, the wardrobe is steadier, with respect to tipping over, than when the wheels are located underneath the wardrobe. When moved to a final location (i.e., placed in storage or in a hotel room), the wheels can be slid back underneath the wardrobe.

Figure 6A:
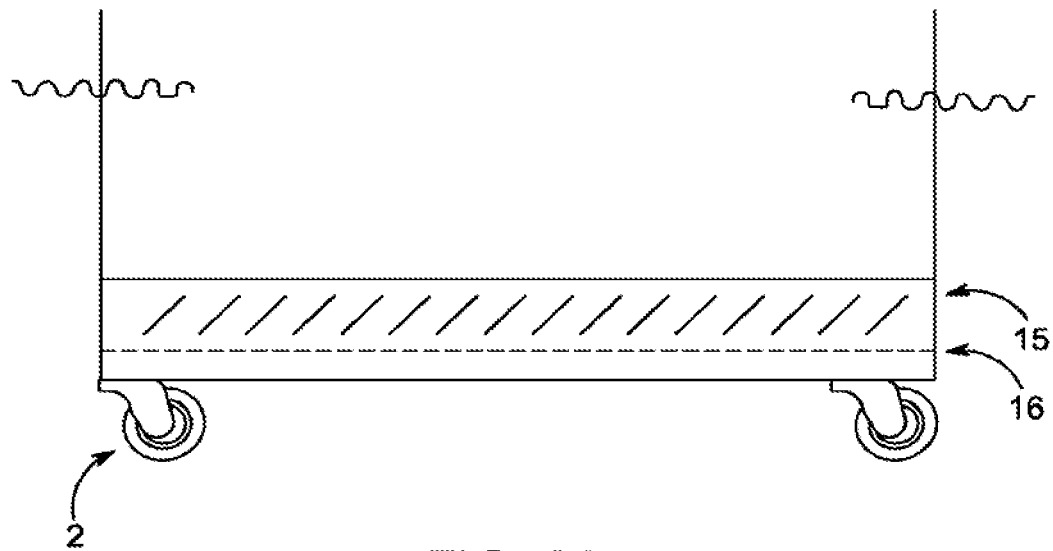
FIG. 6A is a partial view of the face of the moveable wardrobe, focusing on a hinged cover which when folded up, does not cover the wheels.
Figure 6B:
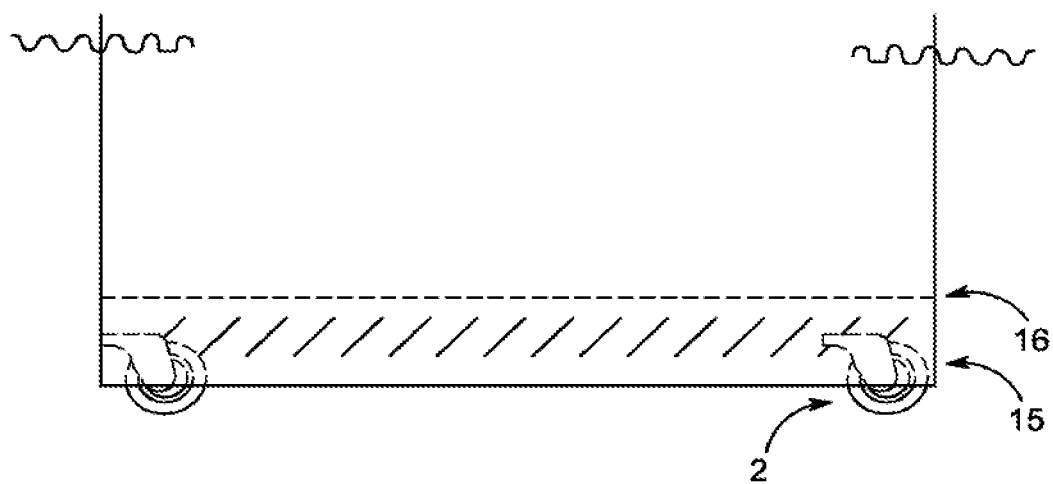
FIG. 6B is a partial view of the face of the moveable wardrobe, focusing on a hinged cover which when folded down, covers the wheels.

From an esthetic perspective, it may be desirable, when the wardrobe is in a hotel room, to partially or completely cover the wheels and give the appearance that the wardrobe is not moveable. FIGS. 6A and 6B show an embodiment where a cover (15) is attached to a hinge (16), which can partially or completely cover the wheels (2) when the wardrobe is not in motion. FIG. 6A shows the cover in an upright position, not covering the wheels, and FIG. 6B shows the cover in a downright position, partially covering the wheels.

Doors/Shutters

Figure 13:
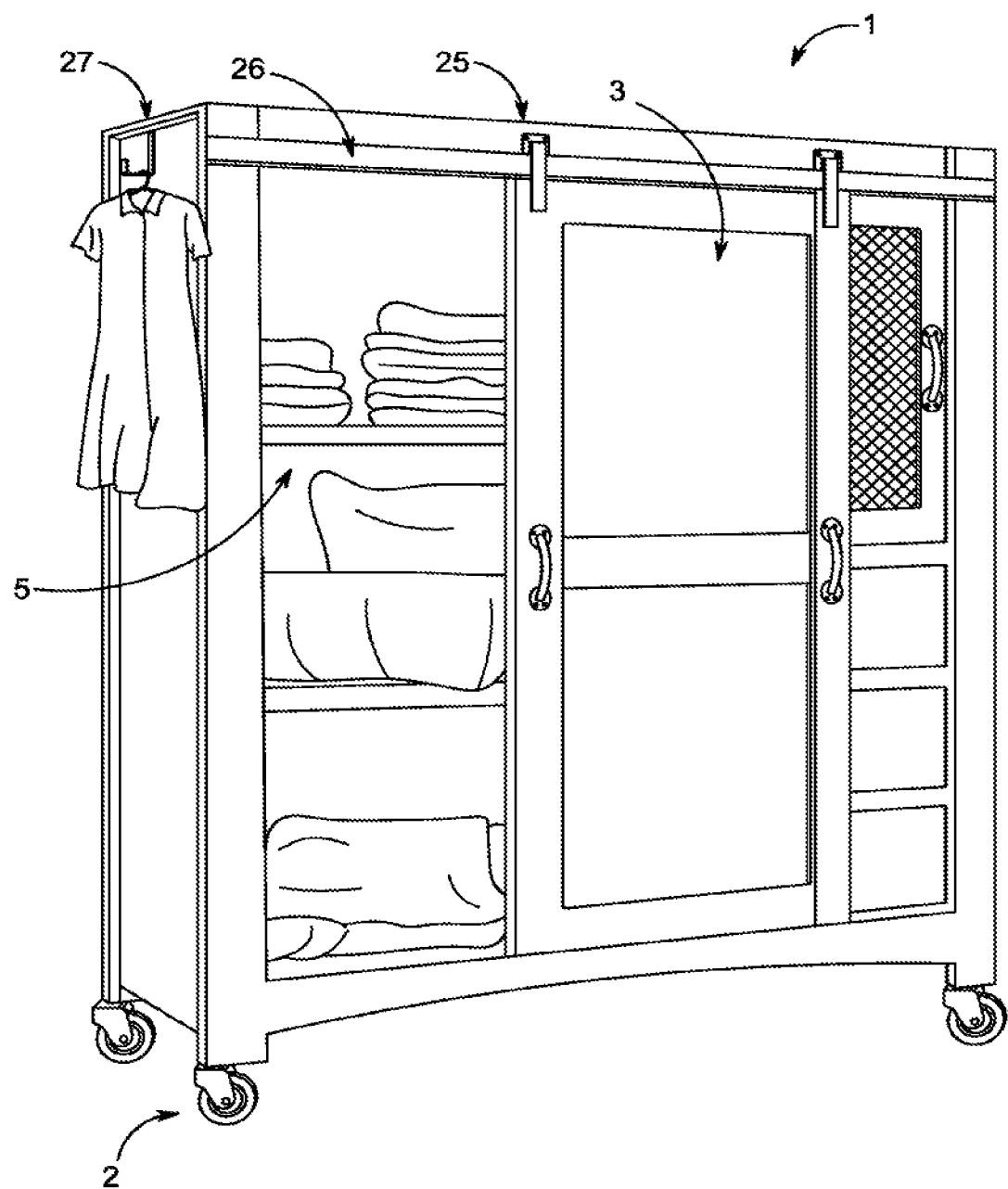
FIG. 13 is a view of a moveable wardrobe comprising a slideable shutter rather than a door.

In some embodiments, the wardrobe also comprises one or more doors, or sliding shutters/doors. Embodiments with doors (3) are shown in FIGS. 1, 2, 8, and 14. An embodiment with sliding shutters/doors is shown in FIG. 13. In FIG. 13, the doors are attached to slides (25) on which the doors can slide on a rail (26). A hook (27) is also shown on the side of the wardrobe (1).

Shelves/Dividers

In those embodiments where shelves are present, the shelves can run through the entire depth of the wardrobe, or a portion thereof. In some embodiments, the shelves are folding shelves, moveable/adjustable shelves, and/or pull-out shelves.

Figure 10:
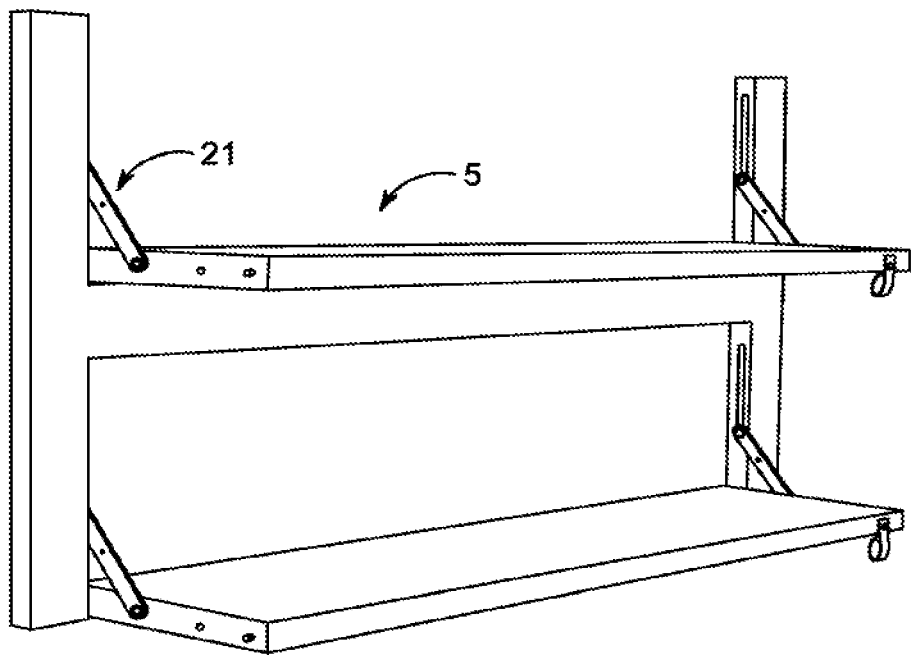
FIG. 10 is a partial view of the side of a wardrobe as described herein, where foldable shelves are shown in the open position, but can be closed as desired.

FIG. 10 shows a portion of a side of a wardrobe (1) as described herein, where two folding shelves (5) are shown. The shelves can be raised or lowered using hinges (21) which run in a groove in the wall.

Figure 11:
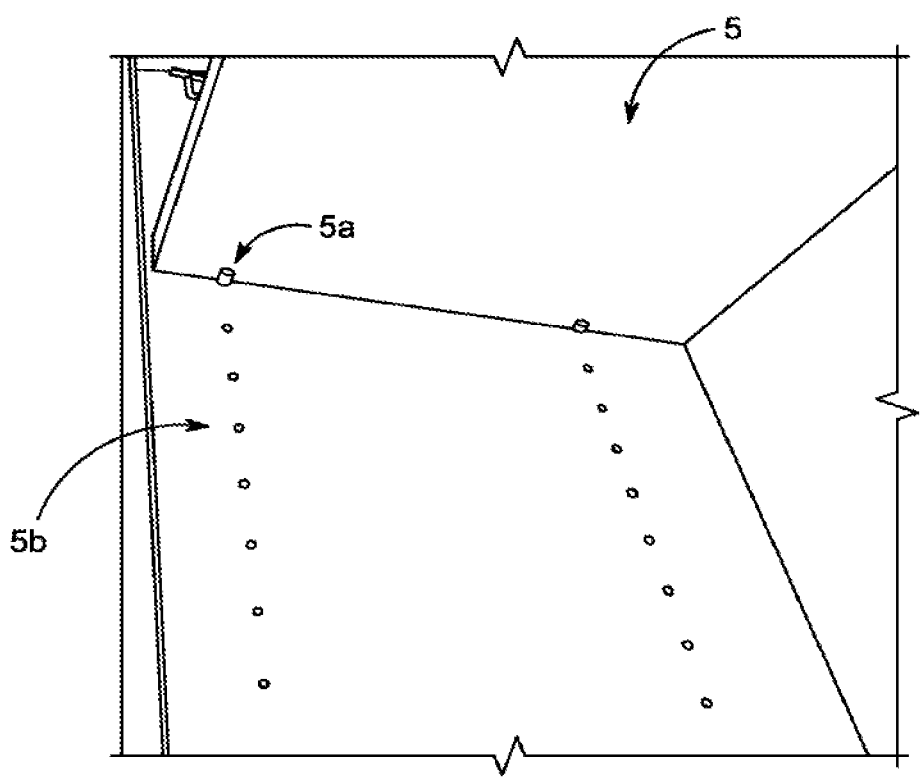
FIG. 11 is a partial view of the side of a wardrobe as described herein, where the side comprises a plurality of holes adapted to receive shelf pins, and an adjustable shelf is "locked" in place using shelf pins.

FIG. 11 shows a portion of a side of a wardrobe (1) as described herein, where a series of holes (Sb) at substantially even heights is shown. The holes (Sb) are sized to receive shelf pins (Sa), and the shelf (5) includes a slot adapted to receive the shelf pin. As a user desires to move/adjust the position of a shelf, the shelf can be lifted off of the shelf pins, the pins moved to a set of holes corresponding to a desired height, and the shelf reinstalled.

Figure 12:
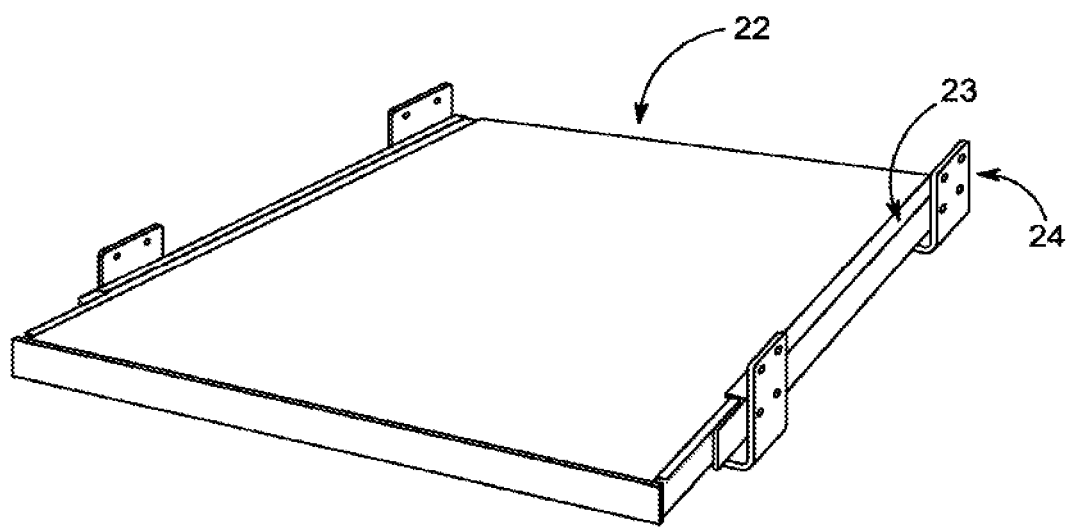
FIG. 12 is a view of a sliding shelf, which can be placed inside the moveable wardrobe, showing points of attachment to the sides/walls of the wardrobe, a track on which the shelf can slide, and the shelf.

FIG. 12 shows a sliding shelf (22) which can be attached to one or more sides/walls in the wardrobe (1). In the embodiment shown, the shelf (22) includes brackets (24) on the front and back of each side of the shelf (22), which can be screwed into the walls/sides of the wardrobe at a desired location. The shelf (22) slides in and out along a track (23).

Pull out shelves ensure that the entire shelf is accessible and nothing gets lost at the back, whereas folding shelves and moveable shelves allow one to move or remove a shelf, which can be of interest as and when objects to be stored would not otherwise fit if the shelves were locked into position.

In one aspect, the shelves are between about 15 and about 18" deep, which depth is ideal for stacking shirts, pants, and the like. Where more than one shelf is used, the height between any two shelves is typically between about 10 inches and about 12 inches.

In one embodiment, there is a divider roughly between about a third of the width, and about half of the width, so that closet rods for pants and shirts can be placed on one portion of the wardrobe, and a closet rod for dresses and coats can be placed on another portion of the wardrobe.

II. Methods of Manufacturing the Wardrobe

Any of a number of construction methods can be used to prepare the wardrobe. For example, the sides can be fitted with dadoes, and the top, bottom, and, optionally, one or more shelves, can be adapted to fit inside the dadoes. The top, bottom, and, optionally, shelves, can be adhered into the dadoes with an adhesive, such as wood glue, and/or mechanically fastened, such as with nails and/or screws.

The wardrobe optionally but preferably comprises a back, which can include a means for attaching the wardrobe to a wall, such as a wall in a room, which can be a hotel room.

Once the top, bottom, and optional shelves are attached to the sides, this can serve as a carcass or frame to which a back, a face frame, one or more shelves, closet rods, and the like can be attached.

The sides of the wardrobe include a front and a back face, and an inside and an outside surface. In one embodiment, a rabbet is milled into the back face of each of the sides so as to receive a back. Alternatively, a dado can be milled near the back of each of the sides, such as between about 0.5-2 inches from the back, so as to receive the back.

Whether installed into a rabbet or a dado, the back can be secured in place, for example, using glue, nails, screws, and combinations thereof. Where screws are used, if desired, screw plugs can be used to hide the heads of the screws. The screw plugs are ideally formed from the same wood as is used to build the wardrobe carcass/frame.

When it is desirable to produce multiple wardrobes, one can mill dadoes and rabbets using CNC routers, for example, or other robotically controlled devices, as such are known in the art.

In those embodiments where crown, base, and/or chair molding is applied, such can be accomplished, for example, using glue and/or mechanical fasteners, such as nails or brads.

In some embodiments, the wardrobe also comprises one or more doors, or sliding shutters. In one aspect of this embodiment, at least one door or sliding shutter comprises a locking mechanism.

The doors and/or shutters can be affixed to the front of the sides, or near the front of the sides, for example, using hinges. Those of skill in the art know how to affix hinges, for example, by preparing an appropriate mortise that fits the hinges, and/or using zero mortice hinges. Door locks can also be affixed within an appropriate mortice.

As with entertainment centers and armoires, hinges allow the doors to open wide enough to access the contents of the wardrobe. In some embodiments, the hinges allow the doors to open around 90 degrees, but other hinges, such as "270 degree hinges," allow the doors to open wider, if such is desired. Pivot door slides can also be used, so that the doors can be opened, and then slide inward on the inside of the wardrobe rather than the outside of the wardrobe. When door slides are used, an inner wall is typically present, so as to attach shelves, closet rods, and the like. The doors, when opened and slid into the wardrobe, reside between the inner and outer walls.

In one embodiment, the shelves are moveable, such as by including shelf pins and a series of holes in which to place the shelf pins and relocate the shelves as desired. In another embodiment, the shelves have the ability to fold up, and as such, can be folded to create more space as needed.

Where one or more shelves are intended to be moveable, jigs which include multiple holes at varying heights can be employed to drill holes in the inside surface of the walls. Shelf pins can be inserted at a desired shelf height, and moved to different holes if the user wishes to adjust the shelf height.

Figure 9:
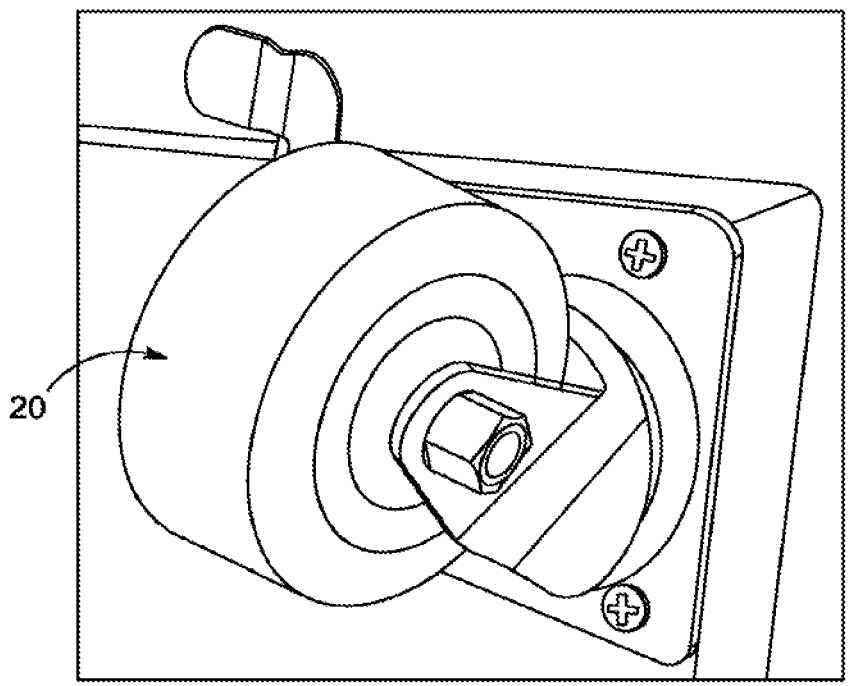
FIG. 9 is a photograph of a wheel with a locking caster, which can allow the wardrobe to be moveable when the wheel is unlocked, and immobilized when the wheel is locked.

One or more of the shelves can alternatively fold (see FIG. 9), such as by including a hinge inside a wall or side of the wardrobe, or at a desired location on the bottom of one or more shelves. By folding the shelves, one can create additional space for taller objects inside the wardrobe.

As shown in FIG. 12, one can attach a sliding shelf to walls/sides of the wardrobe using brackets. The sliding shelf includes a track along which the shelf can slide, in and out of the wardrobe. Similarly, one can use a bracket to attach a sliding tie/belt rack.

Inside the wardrobe, there can be one or more closet rods, drawers, safes, storage boxes, mirrors, cubby holes, tie/belt racks, hampers, and the like.

Closet rods can be set at a desired height, and attached, for example, using a bracket adapted to receive the closet rod, and to also be screwed into the side of the wardrobe. The desired height will depend on whether the closet rods are intended to be used to hang shirts and pants, or dresses.

Standard hangers are usually between 16 inches to 18 inches, so the closet rods, if present, are spaced to provide room for the hangars, and the clothes fitting on the hangers. This can be accomplished, for example, by keeping a gap of around 3 inches between the rod and any shelf that might be placed above it so that hangers can be easily accessed. Rods are typically at a height of around 36 inches for pants and around 40 inches for shirts. For dresses and coats, the rods typically hang at a height of between around 66 inches and around 72 inches.

One or more cubby holes can be enclosed, if desired, by attaching a door.

Storage boxes can be placed, for example, on the bottom of the wardrobe, within one or more cubby holes, and combinations thereof.

One or more mirrors can be placed within the wardrobe at any desired position. For example, mirrors can be placed on the inside of one or more doors, on the inside of one or more sides, on the back, and combinations thereof.

The wardrobe optionally but preferably comprises a back, which can include a means for attaching the wardrobe to a wall, such as a wall in a room, which can be a hotel room.

In some embodiments, the wardrobe also comprises one or more doors, or sliding doors/shutters. In one aspect of this embodiment, at least one door or sliding shutter comprises a locking mechanism. These embodiments are shown, for example, in FIGS. 1, 2, 8, 13 and 14.

Doors are typically attached using hinges affixed to the sides of the wardrobe, and sliding doors/shutters typically slide along a track, which track includes brackets which are attached at or near the top and bottom of the wardrobe, or at least near the top and bottom of the portion of the wardrobe where the sliding doors/shutters are intended to slide to cover, when closed, and uncover, when open.

Wheels for Moving the Wardrobe

The wardrobe is generally of a rectangular or square shape. Where the wardrobe would otherwise touch the floor, there are four wheels, at or near each corner of the bottom of the wardrobe. If the wheels are placed too far inwards (i.e., more than a few inches from each corner of the wardrobe), the wardrobe may inadvertently tip over when rolled, so the wheels are typically at or near the corners of the bottom of the wardrobe. In one embodiment, one or more of the wheels can be locking wheels. Locking wheels (20) are shown, for example, in FIG. 9.

In one embodiment, each of these wheels can be lifted up, and moved downward, by stepping on a caster on the wheel. Thus, when the wardrobe is in a desired location, the user can simply step on the brakes to lock the wardrobe in place. While in one embodiment, all four wheels would include a locking caster, in another embodiment, only the front wheels do. The latter embodiment can be particularly relevant where the wardrobe fits in an enclosure, limiting access to the wheels near the back of the wardrobe when it is in a desired location.

When the wardrobe is at a desired location, the wheels can be raised off the floor, the slides can easily be moved along the track, and the wheels can then to be moved to a position underneath the wardrobe. That is, the one or two wheels on the track can provide additional stability when the wardrobe is moved, and they can slide back to a position hidden from view when the wardrobe is in a more fixed position, that is, when the wardrobe is not being moved.

In one embodiment, one or two slides are located at or near the center of the bottom of the wardrobe, which slides extend outward, and include a wheel. This is shown in FIG. 5, where there are two tracks, one on each side of the wardrobe, along each of which a slide can move inward and outward, with a wheel attached to each slide.

In another embodiment, one or more wheels attached to a brace are releasably attached to the frame of the wardrobe, so as to provide additional stability while the wardrobe is moved, and removed, for example, when the wardrobe is at or near its desired location.

In one embodiment, a hinged cover is located near the bottom of the front of the wardrobe, and when the wardrobe is not being wheeled around, the cover can cover all or part of the wheels. This is shown in FIG. 6A (where the cover is not covering the wheels) and 6B (where the cover has been placed over the wheels.

Means for Attaching the Wardrobe to One or More Walls

In some embodiments, the wardrobe is adapted to be releasably affixed to one or more walls, or a wall that includes an enclosure adapted to receive the wardrobe. The one or more walls are present, for example, in a room, such as a hotel room. That is, the one or more walls and the wardrobe each include a component that allows the wardrobe to be releasably affixed to the one or more walls. Such components can be, for example, one or more holes in the wall, which register with one or more pegs on the back of the wardrobe. The components can alternatively be one or more magnets, or one or more hook and loop fasteners.

Figure 7A:
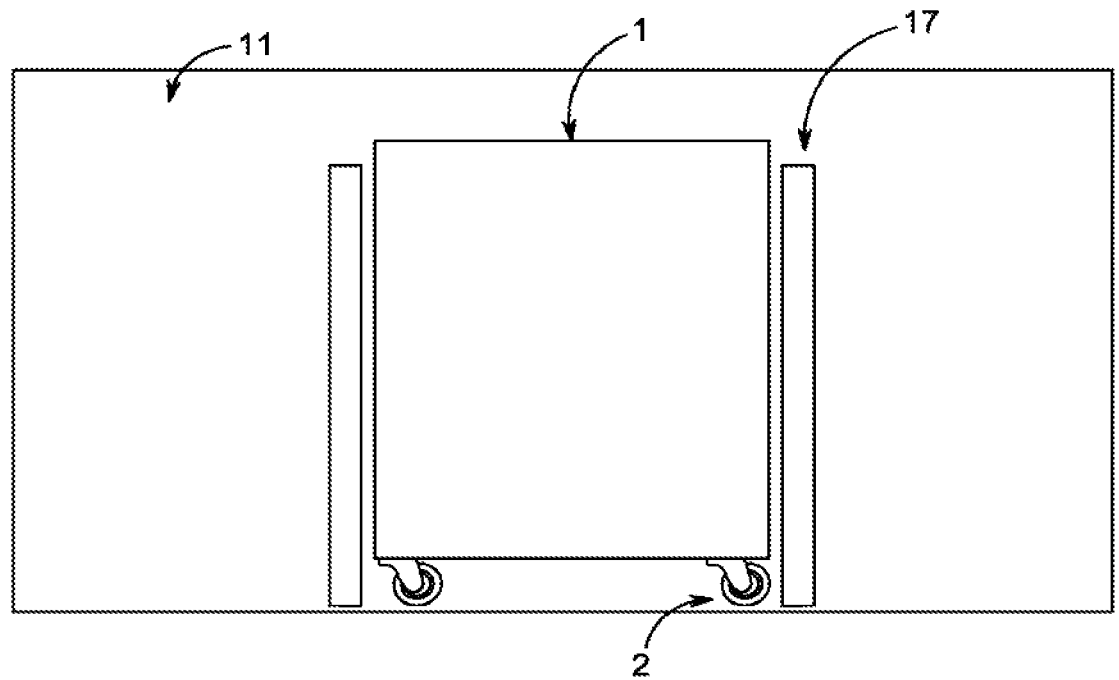
FIG. 7A is a view of a wall with protrusions extending from the wall to form a partition into which the moveable wardrobe can fit, where the moveable wardrobe is positioned within the partition.
Figure 7B:
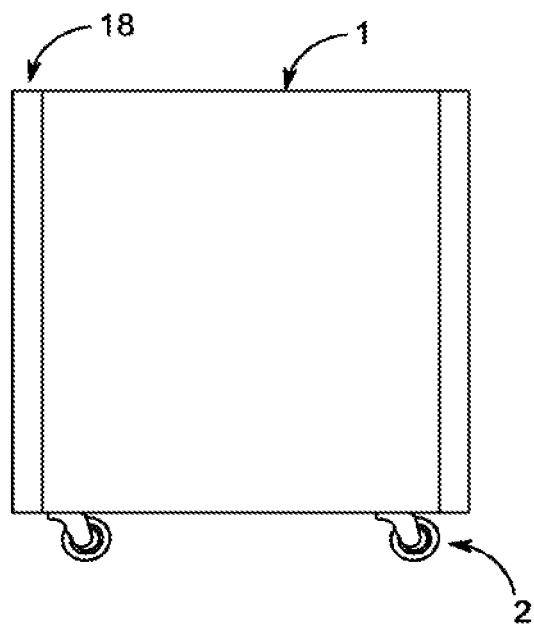
FIG. 7B is a front view of one embodiment of the moveable wardrobe described herein, where the wardrobe comprises a face frame which extends beyond the sides of the wardrobe, so that when the wardrobe is placed in the partition shown in FIG. 7A, the face frame covers the protrusions which make up the partition.

In one embodiment, a wall includes a recess adapted to fit the wardrobe, and in use, the wardrobe is slid into the recess. This is shown in FIG. 7A, where the moveable wardrobe (1) is positioned between two protrusions/walls (17) perpendicular to a wall (11), such as a wall in a hotel room or in a storage room. The wardrobe (1) can be moved, using the wheels (2) between the protrusions. In one aspect of this embodiment, shown in FIG. 7B, the wardrobe (I) includes a face frame (18) which extends beyond the sides of the wardrobe (1), which face frame can cover the protrusions (17) shown in FIG. 7A when the wardrobe is placed into position between the protrusions. Particularly where the face frame (18) and protrusions (17) are made of the same or similar materials, this can give the appearance that the wardrobe is permanently affixed to the wall. In this embodiment, there need not be, and in one aspect of this embodiment, there is not, a means for releasably affixing the wardrobe to the recess or the wall.

The recess is typically between about 1 and about 12 inches in depth, more typically between about 1 and about 3 inches in depth. By fitting the wardrobe into a recess, one can minimize lateral movement, so as to help stabilize the wardrobe in place while it is, in some embodiments, releasably affixed to the wall.

In another embodiment, the room in which the wardrobe is to be located includes a wall which includes one or more protrusions, which can themselves be walls, or, in one aspect of the embodiment, can be made of the same material as the wardrobe.

The one or more protrusions typically have a depth less than or equal to the depth of the wardrobe. Where there are two such protrusions, or where there is a wall parallel to a protrusion, the distance between the two protrusions, or the parallel wall and the protrusion, can be appropriately sized to receive the wardrobe, such that the wardrobe can be rolled into place between the protrusions, or between a protrusion and a wall. In this embodiment, there need not be, and in one aspect of this embodiment, there is not, a means for releasably affixing the wardrobe to the protrusions or the wall.

In one aspect of this embodiment, the wardrobe comprises a face frame, which itself protrudes beyond the sides of the wardrobe, such that when the wardrobe is placed between two protrusions, the face frame fits flush, or substantially so, with the protrusions, thus providing a visual impression that the protrusions are the outside walls of the wardrobe. In this aspect, the protrusions can be formed of the same material, and, when made of wood, can be finished with the same stain and/or finish, as the wardrobe.

In one aspect of this embodiment, the walls of the recess comprise a magnetic strip, and the back of the face frame comprises magnetic strips, where the magnetic strips are positioned such that when the wardrobe is placed within the recess, the walls of the recess magnetically adhere to the faceframe, thus locking it in place. When it is desired to remove the wardrobe, a user can pull hard enough to dislodge the magnets from each other, but in ordinary use, the magnets can provide sufficient stability to the wardrobe such that it does not move about the room in which it is placed. Further, in another aspect, there need not be a means for releasably affixing the faceframe to the recess or the wall.

The wardrobe can be attached to protrusions on the wall, for example, using male/female or female/male attachments on the protrusions and the face frame of the wardrobe, by magnets on the protrusions and the face frame, or other such means of attachment. In one example embodiment, the back of the wardrobe can include a means for attachment to one or more walls in a room in which the wardrobe will be used. FIG. 3 shows an example means 31 for attachment of the back of the wardrobe to a wall. Suitable means 31 for attachment include holes through which pins can be inserted, pins which fit into holes in a wall, one or more pegs on the back of the wardrobe which register with one or more holes in a wall, Velcro or other hook and loop attachments, straps, ropes, magnets, clips, cotter pins, and the like.

Figure 8:
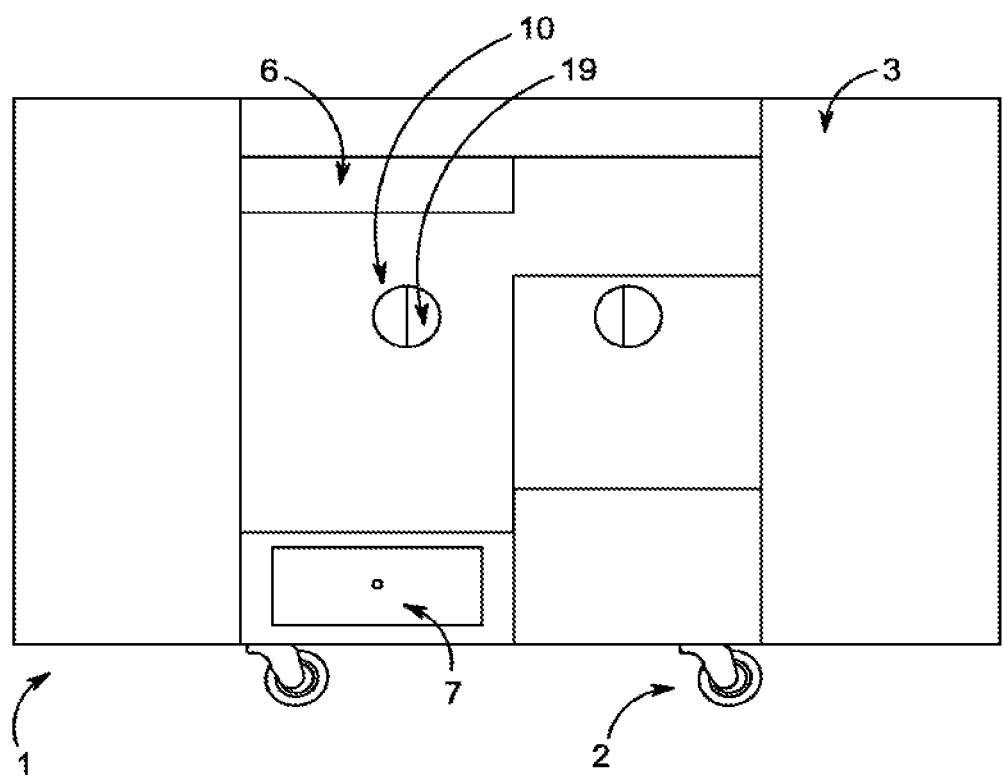
FIG. 8 is a drawing of an embodiment of the moveable wardrobe described herein, where holes are located in the back of the wardrobe, and pins are provided in the holes, where a rope, strap, or clip on the wall can be releasably adhered to the pins to lock the wardrobe in place.

In another embodiment, shown in FIG. 8, one or more holes (10) are located in the back of the wardrobe (1) (two such holes are shown in FIG. 8), and a pin (19) traverses the holes. A catch, clip, or other suitable connector, located on the wall (not shown) can connect to the one or more pins. Alternatively, a strap, rope, other material which be tied, or Velcro, attached to the wall, or a support attached to the wall, to can be used to adhere the wardrobe (1) to the wall. Also shown in FIG. 8 are a closet rod (6), two open doors (3), a drawer (7), and wheels (2).

In one embodiment, magnets in predetermined locations on the wardrobe or the wall attach to metal plates or magnets present at corresponding locations on the wall or wardrobe. This can be visualized in FIGS. 4A and 4B, where instead of holes (10) and protrusions (12) in the wardrobe and the wall, magnets and plates are present.

In one embodiment, one or more magnets is placed underneath the coating of the wardrobe (i.e., paint, a wood veneer, and the like) so the magnets are not visible on the wardrobe.

The present invention will now be described with reference to the following non-limiting examples.

Example 1: Representative Wardrobe

Figure 14:
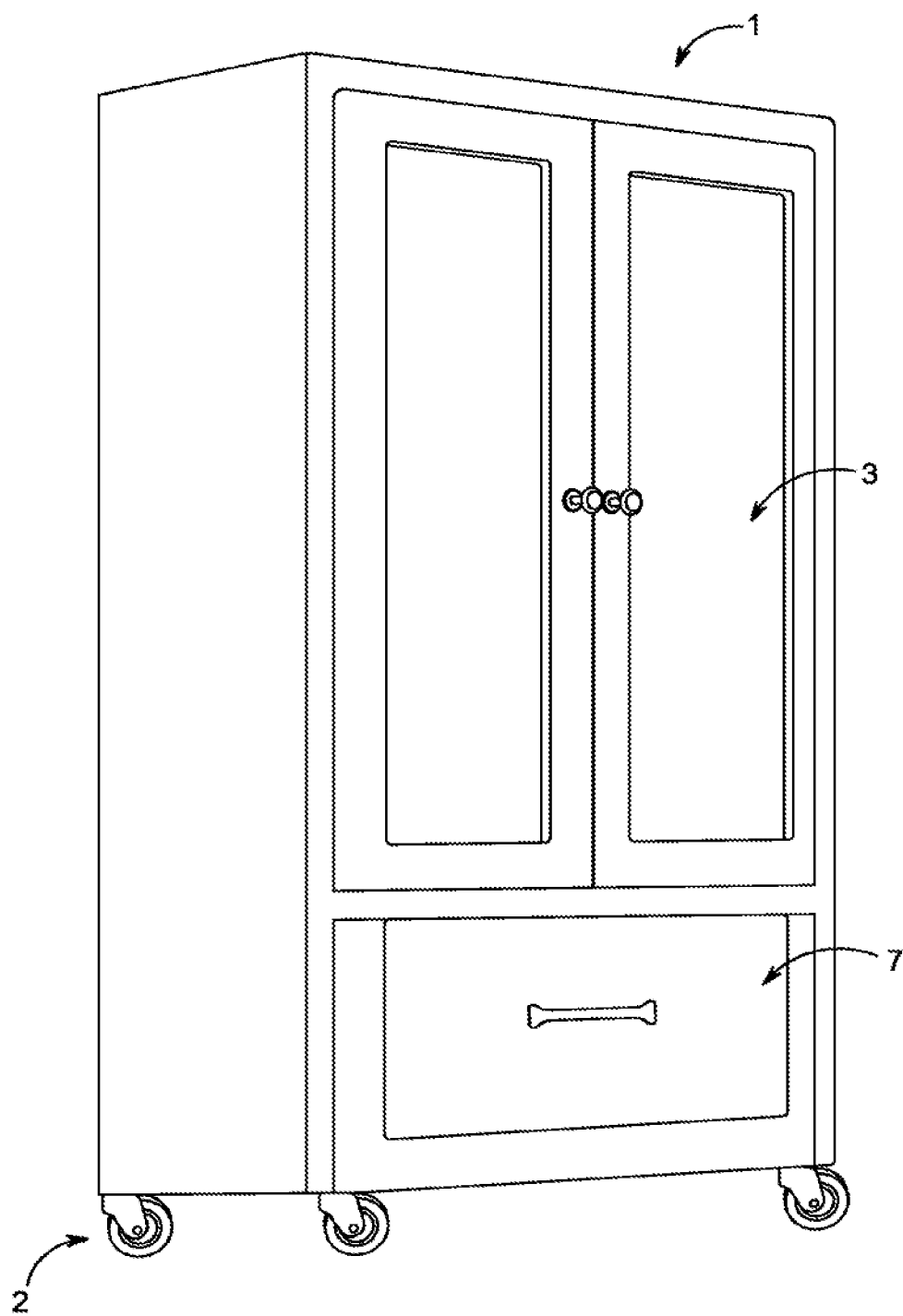
FIG. 14 is a view of a fine furniture grade version of the moveable wardrobe described herein, complete with raised panel doors, a drawer, and brass handles.

FIG. 14 is an example of a furniture grade wardrobe equipped with wheels, and, though not shown in FIG. 14, a means for fastening the wardrobe to a wall in a hotel room and/or a storage room. The wardrobe can include raised panel doors and one or more solid wood drawers, as well as brass door knobs, and as such can be suitable for use in high-end hotel rooms.

Even though reference is made to a specific embodiment of the invention, it is apparent for a person skilled in the art that the described wardrobe box is susceptible of numerous variations and modifications, and that all the details cited can be substituted by other technically equivalent ones, without departing from the scope of protection defined by the attached claims.

The invention claimed is:

1. A wardrobe comprising:
    a top,
    a bottom,
    two side walls,
    a back,
    four wheels along the bottom,
    a cover, and
    a hinge,
    wherein:
        the back includes at least one peg configured to releasably affixed the wardrobe to one or more holes in a wall;
        the hinge is at a bottom of a front of the wardrobe and attaches the cover to the front of the wardrobe;
        the cover is configured to be in an upright position and in a downright position; and
        in the upright position, the cover is not covering the wheels and in the downright position, the cover is covering the wheels.

2. The wardrobe of claim 1, further comprising one or more doors or sliding shutters.

3. The wardrobe of claim 2, wherein one or more doors are sliding doors.

4. The wardrobe of claim 2, wherein the one or more doors or the sliding shutters comprise a lock.

5. The wardrobe of claim 1, wherein at least one of the wheels is a lockable wheel.

6. The wardrobe of claim 1, further comprising two slides located at a center of the bottom of the wardrobe, wherein each slide is coupled to an extendable wheel configured to extend outward using the slide.

7. The wardrobe of claim 1, further comprising one or more additional components, selected from the group consisting of drawers, shelves, closet rods, tie/belt racks, mirrors, cubby holes, a cover for the wheels, and a safe.

8. The wardrobe of claim 1, further comprising one or more of crown, chair, and base molding.

9. The wardrobe of claim 1, further comprising a folding shelf on one of the two side walls, wherein the folding shelf is configured to be raised or lowered using hinges which run in a groove in the one side wall.

10. The wardrobe of claim 1, wherein each wheel is configured to be lifted up or moved downward by stepping on a caster on the wheel.

11. The wardrobe of claim 1, further comprising Velcro on the back for affixing the wardrobe to the wall.

12. The wardrobe of claim 1, further comprising hook and loop attachments for affixing the wardrobe to the wall.

13. The wardrobe of claim 1, further comprising straps for affixing the wardrobe to the wall.

14. The wardrobe of claim 1, further comprising a magnet on the back for affixing the wardrobe to the wall.

15. The wardrobe of claim 14, wherein the magnet is placed underneath a coating of the back so that the magnet is not visible on the wardrobe.

16. The wardrobe of claim 1, further comprising a face frame, the face frame protrudes beyond the two side walls of the wardrobe such that when the wardrobe is placed between two protrusions, the face frame fits flush with the protrusions.

17. A wardrobe comprising:
    a top, a bottom, two side walls, a back, four wheels on the bottom, a cover, and a hinge;
    wherein:
        the back includes at least two holes and a pin is configured to traverse each hole to releasably affixed the wardrobe to a wall;
        the hinge is at a bottom of a front of the wardrobe and attaches the cover to the front of the wardrobe;
        the cover is configured to be in an upright position and in a downright position; and
        in the upright position, the cover is not covering the wheels and in the downright position, the cover is covering the wheels.

18. The wardrobe of claim 17, further comprising a catch or a clip, the catch or the clip is configured to connect to the pin.

19. A wardrobe comprising:
    a top, a bottom, two side walls, a back, four wheels on the bottom, a cover, and a hinge;
    wherein:
        the back includes a magnet configured to releasably affixed the wardrobe to a metal plate;
        the hinge is at a bottom of a front of the wardrobe and attaches the cover to the front of the wardrobe;
        the cover is configured to be in an upright position and in a downright position; and
        in the upright position, the cover is not covering the wheels and in the downright position, the cover is covering the wheels.

20. The wardrobe of claim 19, wherein the magnet is placed underneath a coating of the wardrobe so that the magnet is not visible on the wardrobe.

* * * * *